United States Patent
Goodman et al.

(10) Patent No.: US 11,539,936 B2
(45) Date of Patent: Dec. 27, 2022

(54) IMAGING SYSTEM FOR THREE-DIMENSIONAL SOURCE LOCALIZATION

(71) Applicant: H3D, Inc., Ann Arbor, MI (US)

(72) Inventors: David Goodman, Ann Arbor, MI (US); Brian Kitchen, Saline, MI (US)

(73) Assignee: H3D, Inc., Ann Arbor, MI (US)

( * ) Notice: Subject to any disclaimer, the term of this patent is extended or adjusted under 35 U.S.C. 154(b) by 43 days.

(21) Appl. No.: 17/212,614

(22) Filed: Mar. 25, 2021

(65) Prior Publication Data

US 2022/0311988 A1     Sep. 29, 2022

(51) Int. Cl.
*H04N 13/296*    (2018.01)
*H04N 13/156*    (2018.01)

(52) U.S. Cl.
CPC ......... *H04N 13/296* (2018.05); *H04N 13/156* (2018.05)

(58) Field of Classification Search
CPC .. H04N 13/296; H04N 13/156; G01T 1/2907; G01T 7/00
USPC .......................................................... 348/43
See application file for complete search history.

(56) References Cited

U.S. PATENT DOCUMENTS

| | | | |
|---|---|---|---|
| 5,331,553 A | 7/1994 | Muehllehner et al. | |
| 6,815,687 B1 | 11/2004 | Branch-Sullivan et al. | |
| 7,327,853 B2 | 2/2008 | Ying et al. | |
| 7,417,231 B2 | 8/2008 | Defrise et al. | |
| 8,354,648 B2 | 1/2013 | Laurent et al. | |
| 9,568,612 B1 | 2/2017 | Faraj et al. | |
| 2008/0158053 A1* | 7/2008 | Watanabe | G01S 19/45 342/357.29 |
| 2010/0038550 A1* | 2/2010 | DeVito | G01V 5/0069 250/370.11 |

(Continued)

FOREIGN PATENT DOCUMENTS

FR   2923055 A1   5/2009
KR   102104545 B1   4/2020

(Continued)

OTHER PUBLICATIONS

Michael S. Lee et al., "3-D Volumetric Gamma-Ray Imaging and Source Localization With a Mobile Robot—18124", WM2018 Conference, Mar. 18-22, 2018, Phoenix, Arizona, USA.

(Continued)

*Primary Examiner* — Susan E. Torgerson
(74) *Attorney, Agent, or Firm* — Quinn IP Law

(57) ABSTRACT

An imaging system includes a detector configured to obtain radiation data from one or more sources and a controller. The controller is configured to define plurality of buffers based on at least one initial condition. The radiation data includes a plurality of events. The controller is configured to receive an individual event of the plurality of events and determine if the individual event falls within a designated current buffer. Each of the plurality of events in the current buffer is corrected for pose and aligned in a common two-dimensional space. The plurality of events in the current buffer are reconstructed into a three-dimensional space, the reconstruction being done once for each of the plurality of buffers. The controller is configured to create a three-dimensional image based in part on the reconstruction in the three-dimensional space.

17 Claims, 3 Drawing Sheets

(56) References Cited

U.S. PATENT DOCUMENTS

| | | | | |
|---|---|---|---|---|
| 2011/0006195 A1* | 1/2011 | Prendergast | .......... | G01T 1/2907 |
| | | | | 250/252.1 |
| 2013/0287278 A1* | 10/2013 | Olivier | .................. | G06T 11/003 |
| | | | | 382/131 |
| 2013/0334429 A1* | 12/2013 | Fukuchi | ................ | G01T 1/2985 |
| | | | | 250/363.03 |
| 2020/0142081 A1 | 5/2020 | Newman | | |
| 2021/0239862 A1* | 8/2021 | Petrak | ................... | G01T 1/2907 |

FOREIGN PATENT DOCUMENTS

| | | |
|---|---|---|
| WO | 2007144624 A2 | 12/2007 |
| WO | 2010074400 A2 | 7/2010 |
| WO | 2015051350 A1 | 4/2015 |

OTHER PUBLICATIONS

Ross Wegner Barnowski, "Development and Evaluation of Real-Time Volumetric Compton Gamma-Ray Imaging", California Digital Library, University of California, 2016.
https://pubmed.ncbi.nlm.nih.gov/31167360/ (accessed Mar. 25, 2021).
https://ieeexplore.ieee.org/document/4812296 (accessed Mar. 25, 2021).
International Search report for an international application No. EP22160791, dated Aug. 22, 2022.

\* cited by examiner

IMAGING SYSTEM FOR THREE-DIMENSIONAL SOURCE LOCALIZATION

STATEMENT REGARDING FEDERALLY SPONSORED RESEARCH OR DEVELOPMENT

This invention was made with Government support under Agreement No HDTRA1-19-C-0025, awarded by the United States Department of Defense. The United States Government may have certain rights in this invention.

INTRODUCTION

The present disclosure relates generally to an imaging system for source localization. Sources emitting radiation may be found in a variety of settings, including but not limited to, power plants and nuclear medicine departments. Multi-directional detectors, which are sensitive to radiation emanating from all directions, may be employed to pinpoint the location of a source of interest. The radiation emitted is composed of multiple individual events. These individual events are captured by the multi-directional detectors and generally reconstructed one-by-one in full three-dimensional space. However, reconstructing in three-dimensional space is intrinsically computationally burdensome. Additionally, this computational burden increases linearly with the number of image elements being employed.

SUMMARY

Disclosed herein is an imaging system with a detector configured to obtain radiation data from one or more sources. A controller is configured to receive the radiation data, which includes a plurality of events. The controller has a processor and tangible, non-transitory memory on which instructions are recorded. Execution of the instructions by the processor causes the controller to define a plurality of buffers, based on one or more initial conditions, and set one of the plurality of buffers as a current buffer. The controller is configured to receive an individual event of the plurality of events and determine if the individual event falls within the current buffer.

The controller is configured to align the plurality of events in the current buffer in a common two-dimensional space. The plurality of events in the current buffer are reconstructed into a three-dimensional space, the reconstruction into the three-dimensional space being done once for each of the plurality of buffers. The controller is configured to create a three-dimensional image based in part on the reconstruction in the three-dimensional space. The controller is configured to each of the plurality of events within the current buffer for pose (on an event-by-event basis) prior to aligning the plurality of events in the two-dimensional space.

Correcting the plurality of events within the current buffer includes time-tagging the plurality of events with a respective event time, obtaining a respective detector pitch, a respective detector yaw and a respective detector roll of the detector at the respective event time, and shifting the plurality of events in angular space by the respective detector pitch, the respective detector yaw and the respective detector roll. After reconstructing the plurality of events in the current buffer in the three-dimensional space, the controller is configured to designate another of the plurality of buffers as the current buffer.

In some embodiments, the at least one initial condition is time-based such that the current buffer is within a predefined start time and a predefined end time, the individual event defining an event time. The individual event falls within the current buffer when the event time is within the predefined start time and the predefined end time. In some embodiments, the at least one initial condition is distance-based such that the current buffer defines a respective buffer location, the individual event defining an event position. The individual event falls within the current buffer when a respective distance between the event position and the respective buffer location is less than or equal to a threshold distance.

The initial condition includes an updating frequency of the plurality of buffers. The updating frequency may be between about 0.5 and 3 seconds. The detector may be configured to be position sensitive. Aligning the plurality of events in the two-dimensional space may include representing the plurality of events in the current buffer as respective Compton cones and overlaying the respective Compton cones together in the two-dimensional space. Reconstructing the plurality of events into the three-dimensional space may include determining an average global position for the current buffer, the average global position being an average of a respective event position for the plurality of events in the current buffer.

Reconstructing the plurality of events into the three-dimensional space includes representing the three-dimensional space by three-dimensional voxels and obtaining respective angles between each of the three-dimensional voxels and the average global position in the three-dimensional space. Reconstructing the plurality of events into the three-dimensional space further includes obtaining corresponding pixel values from the current buffer based on the respective angles, the corresponding pixel values being represented by respective Compton cones, and adding a respective contribution of the corresponding pixel values to the three-dimensional voxels.

Disclosed herein is a method of operating an imaging system having a detector configured to obtain radiation data and a controller with a processor and tangible, non-transitory memory on which instructions are recorded. The method includes defining a plurality of buffers based on at least one initial condition and designating one of the plurality of buffers as a current buffer, via the controller. The radiation data includes a plurality of events. The method includes receiving the radiation data and determining if an individual event of the plurality of events falls within the current buffer, via the controller. The method includes aligning the plurality of events in the current buffer in a two-dimensional space, and reconstructing the plurality of events in the current buffer in a three-dimensional space, via the controller, the reconstruction being done once for each of the plurality of buffers. A three-dimensional image is created based in part on the reconstruction in the three-dimensional space, via the controller.

The above features and advantages and other features and advantages of the present disclosure are readily apparent from the following detailed description of the best modes for carrying out the disclosure when taken in connection with the accompanying drawings.

Figure 1:
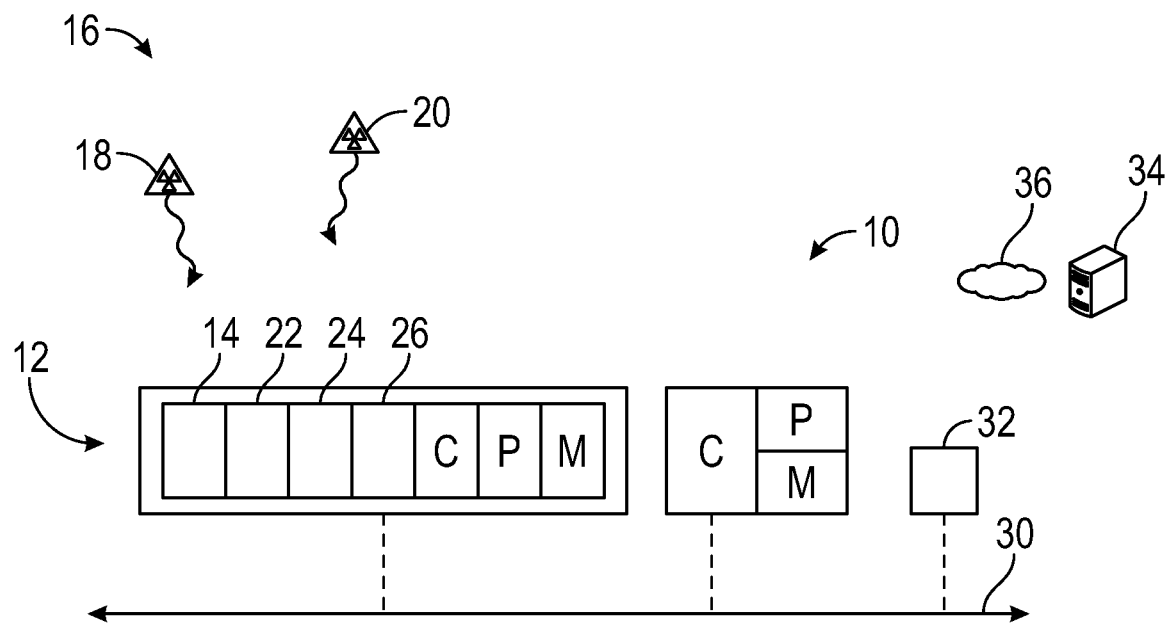
FIG. 1 is a schematic illustration of an imaging system having a detector and a controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates an imaging system 10 having an imaging device 12. The imaging device 12 includes a detector 14 configured to detect radiation emanating from a plurality of directions. The detector 14 may include a semiconductor, such as for example, a cadmium zinc telluride (CdZnTe) compound. The detector 14 may include a Compton camera which utilizes Compton scattering to determine the spatial origin of the observed radiation. The detector 14 may employ other types of sensor technology available to those skilled in the art.

Referring to FIG. 1, the detector 14 is configured to obtain position-sensitive radiation data of at least one source of interest 16, such as first source 18 and second source 20. The source of interest 16 may be a gamma-emitting radioisotope. The source of interest 16 may emit alpha, beta and electromagnetic radiation, neutrons or other type of radiation phenomenon known to those skilled in the art. In one example, the source of interest 16 is gamma-emitting Cesium-137. The detector 14 is configured to be time-sensitive and record the radiation data as a function of time. In the case of gamma rays, each photon may be involved in multiple interactions. The detector 14 may be in motion while capturing the radiation data. For example, the detector 14 may be carried around by a user or positioned on a mobile platform (not shown) that is remotely controlled.

Referring to FIG. 1, the imaging device 12 may include an optical camera 22 configured to capture an optical image of the source of interest 16. Spatial information on both global position and pose may be obtained from a number of methods available to those skilled in the art. The imaging device 12 may include a laser range finder 24 configured to determine a distance to a target, for example, by sending a laser pulse in a narrow beam towards the target and measuring the time taken by the pulse to be reflected off the target and returned back. The imaging device 12 may include a GPS (global positioning system) unit 26 or other device adapted to transmit global position coordinates of the detector 14. The imaging device 12 may employ visual odometry, where the position and pose of an object is estimated from a sequence of images. The visual odometry information may be collected using a single stereo camera and/or dual stereo cameras, and may include color information (e.g., RGB) and depth information (e.g., RGB-D).

The imaging device 12 may include a spectrometer (not shown) that detects distribution of intensity (counts) of radiation versus the energy of the respective radiation. The imaging device 12 may include associated circuitry or electronics (not shown) appropriate to the application at hand. For instance, the circuitry may include a photomultiplier tube, a silicon photodiode, other photon-electron conversion devices, high voltage supply, preamplifier, amplifier and analog to digital converter (ADC). The imaging system 10 may take many different forms and include multiple and/or alternate components and facilities.

Figure 3:
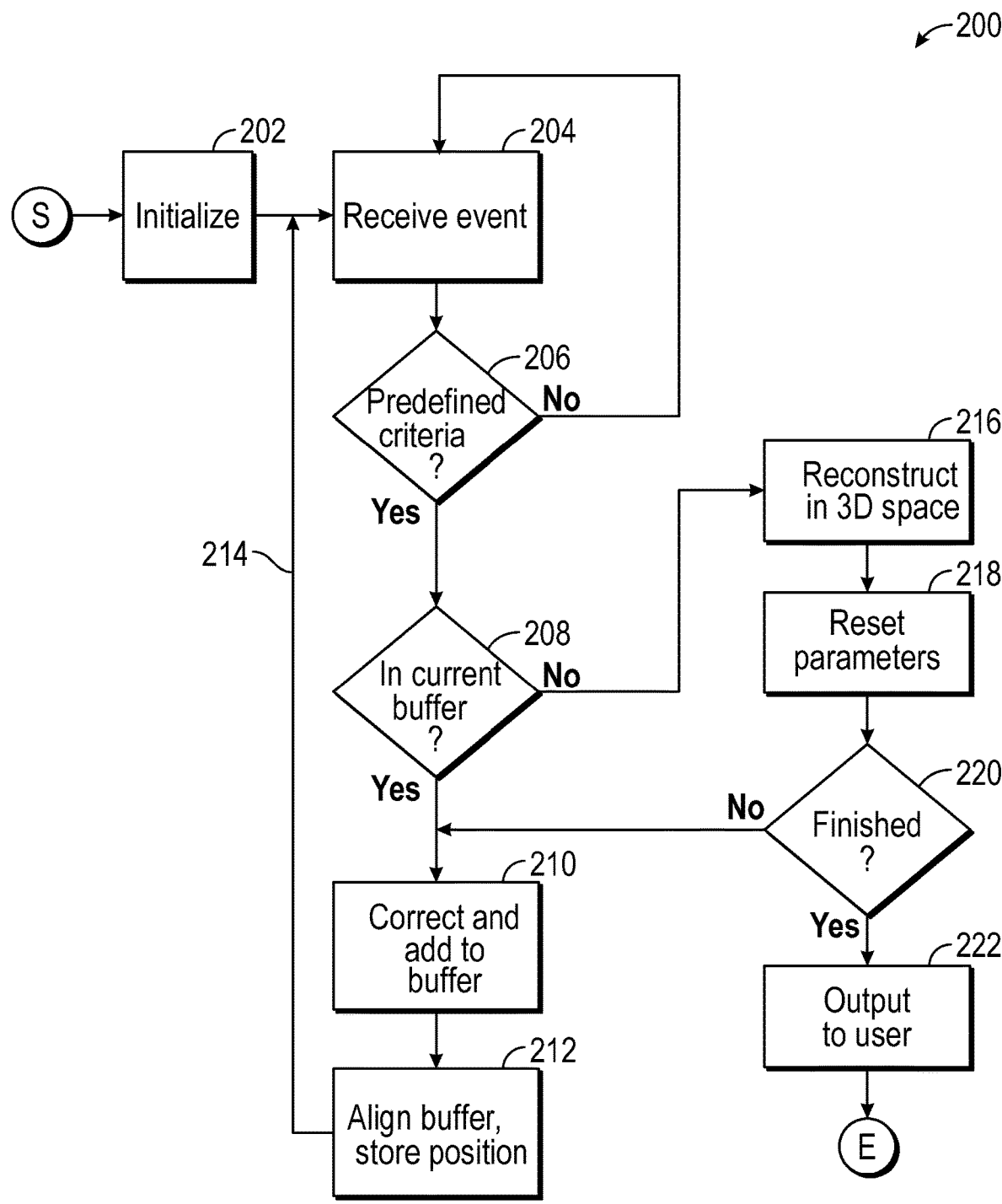
FIG. 3 is a flowchart for an example method executable by the controller of FIG. 1.

Referring to FIG. 1, the imaging system 10 includes a controller C operatively connected to and configured to control the operation of the imaging device 12. Referring to FIG. 1, the controller C includes at least one processor P and at least one memory M (or any non-transitory, tangible computer readable storage medium) on which instructions are recorded for executing method 200, for reconstructing a three-dimensional image or distribution of the source of interest 16 based at least partially on the radiation data. Method 200 is shown in FIG. 3 and described below. The memory M can store controller-executable instruction sets, and the processor P can execute the controller-executable instruction sets stored in the memory M.

As described below, the imaging system 10 employs a combined two-dimensional to three-dimensional approach that greatly reduces the computational burden of imaging three-dimensional space. The imaging system 10 uses two-dimensional imaging data (e.g., of gamma rays) to obtain three-dimensional projection by binning events together, then projecting into three-dimensional space to obtain a completed three-dimensional image. Events are first imaged in a common two-dimensional angular space and corrected for the rotational detector pose. Changes in detector pose, which may be recorded as roll, pitch and yaw, are used to translate detector events to a common, global reference frame which allows for the two-dimensional to three-dimensional reconstruction process. The imaging system 10 enables full three-dimensional imaging (e.g., gamma-ray imaging) on a mobile platform, with weak computational resources.

The controller C may be configured to control the operation of the detector 14 and as well as acquisition, processing and storage of the radiation data. The detector 14 and/or controller C may be configured to record a respective sequence of counts (e.g., 1=counts and 0=no counts) as a function of time or spatial location. The controller C (along with the processor P and memory M) may be an integral portion of the imaging device 12. Alternately, the controller C (along with the processor P and memory M) may be a separate module in communication with the imaging device 12, via a network 30. A display device 32, such as a tablet, may connect wirelessly to the controller C (e.g., via the network 30) for real-time display of the images some distance away.

The network 30 may be a serial communication bus in the form of a local area network. The local area network may include, but is not limited to, a Controller Area Network (CAN), a Controller Area Network with Flexible Data Rate (CAN-FD), Ethernet, blue tooth, WIFI and other forms of data. The network 30 may be a Wireless Local Area Network (LAN) which links multiple devices using a wireless distribution method, a Wireless Metropolitan Area Networks (MAN) which connects several wireless LANs or a Wireless Wide Area Network (WAN) which covers large areas such as neighboring towns and cities. Other types of connections may be employed.

The controller C of FIG. 1 is specifically programmed to execute the blocks of method 200 (discussed in detail below with respect to FIG. 3) and may have access to information downloaded from remote sources and/or executable programs. Referring to FIG. 1, the controller C may be configured to communicate with a remote server 34 and/or a cloud unit 36, via the network 30. The remote server 34 may be a private or public source of information maintained by an organization, such as for example, a research institute, a company, a university and/or a hospital. The cloud unit 36 may include one or more servers hosted on the Internet to store, manage, and process data.

Referring now to FIG. 3, a flowchart of the method 200 stored on and executable by the controller C of FIG. 1 is shown. The start and end of method 200 are respectively shown as "S" and "E." Method 200 need not be applied in the specific order recited herein. Furthermore, it is to be understood that some steps may be eliminated.

The method 200 may begin with block 202, where the controller C is programmed to initialize or define one or more initial conditions, which include reconstruction parameters used to initialize data structures for the two-dimensional and three-dimensional reconstruction of the image or distribution of the source of interest 16 (see FIG. 1). The initial conditions may include defining a two-dimensional grid size, a two-dimensional pixel size, a three-dimensional grid size and a three-dimensional voxel size.

Block 202 includes defining a plurality of buffers based on the initial conditions. The plurality of buffers may be temporally or spatially defined. In one embodiment, the initial condition is time-based such that each respective buffer in the plurality of buffers starts at a predefined start time ($t_{min,buffer}$) and ends at a predefined end time ($t_{max,buffer}$), such that $t_{max,buffer}=[t_{min,buffer}+\Delta t]$. Here, an individual event falls within the respective buffer when the event time ($t_{event}$) is within the predefined start time and the predefined end time, such that $t_{min,buffer} \leq t_{event} \leq t_{max,buffer}$. Block 202 includes defining a buffer updating frequency, which may be temporally or spatially defined. In one example, the buffer updating frequency is between about 0.5 and 3 seconds.

In another embodiment, the initial condition is distance-based such that each respective buffer in the plurality of buffers defines a respective buffer location ($x_{buffer}$, $y_{buffer}$, $z_{buffer}$). Here, an individual event falls within the respective buffer when a respective distance (d) between the event position ($x_{global}$, $y_{global}$, $z_{global}$) and the respective buffer location ($x_{buffer}$, $y_{buffer}$, $z_{buffer}$) is less than or equal to a threshold distance ($\Delta d$). In one example, the buffer updating frequency may be between about 50 and 100 cm.

Per block 204 of FIG. 3, the controller C is programmed to receive an individual event from the radiation data captured by the detector 14. The detector 14 is adapted to send out time-tagged radiation events, consisting of up to N interactions. Each interaction, referred to herein as "event", is characterized by an event position (x, y, z), and energy absorbed (E), as follows: $(x, y, z, E)_1, (x, y, z, E)_2, \ldots (x, y, z, E)_N$. Each individual event is time-tagged with an event time ($t_{event}$). Each of the plurality of events is tagged with an event position or location. The event position may be described based on Cartesian coordinates. Alternatively, the event position may be specified in terms of a polar angle ($\theta$) and an azimuth angle ($\varphi$). The polar angle ($\theta$) is measured from the Z axis, and the azimuth angle ($\varphi$) is the orthogonal projection of the event position (on the XY plane that passes through the origin and orthogonal to the Z-axis), measured from the X-axis. The detector 14 may stream the events in real-time to the controller C.

Additionally, the detector 14 is adapted to transmit a detector position in real-time, referred to herein as the global detector position, which may be expressed in Cartesian coordinates as ($x_{glob}$, $y_{glob}$, $z_{glob}$). The initial global position may be selected to be zero, i.e., ($x_{global}$, $y_{global}$, $z_{global}$)=(0, 0, 0). The detector 14 is adapted to transmit a global detector pose (position and orientation) in real-time, which may be expressed as a set of roll, pitch and yaw parameters ($roll_{glob}$, $pitch_{glob}$, $yaw_{glob}$).

Per block 206 of FIG. 3, the controller C is programmed to determine if one or more predefined criteria is met. The predefined criteria may include the energy of the event being within a specified energy range, i.e., between a minimum energy and a maximum energy. In another example, the controller C may process the individual event (received in block 204) in real-time to determine whether or not it fits within at least one predefined modality. The predefined modality may include, but is not limited to, Compton imaging, coded aperture imaging or attenuation-based imaging. If the predefined criteria are met, the method 200 proceeds to block 208. If not, the method 200 loops back to block 204.

Figure 4:
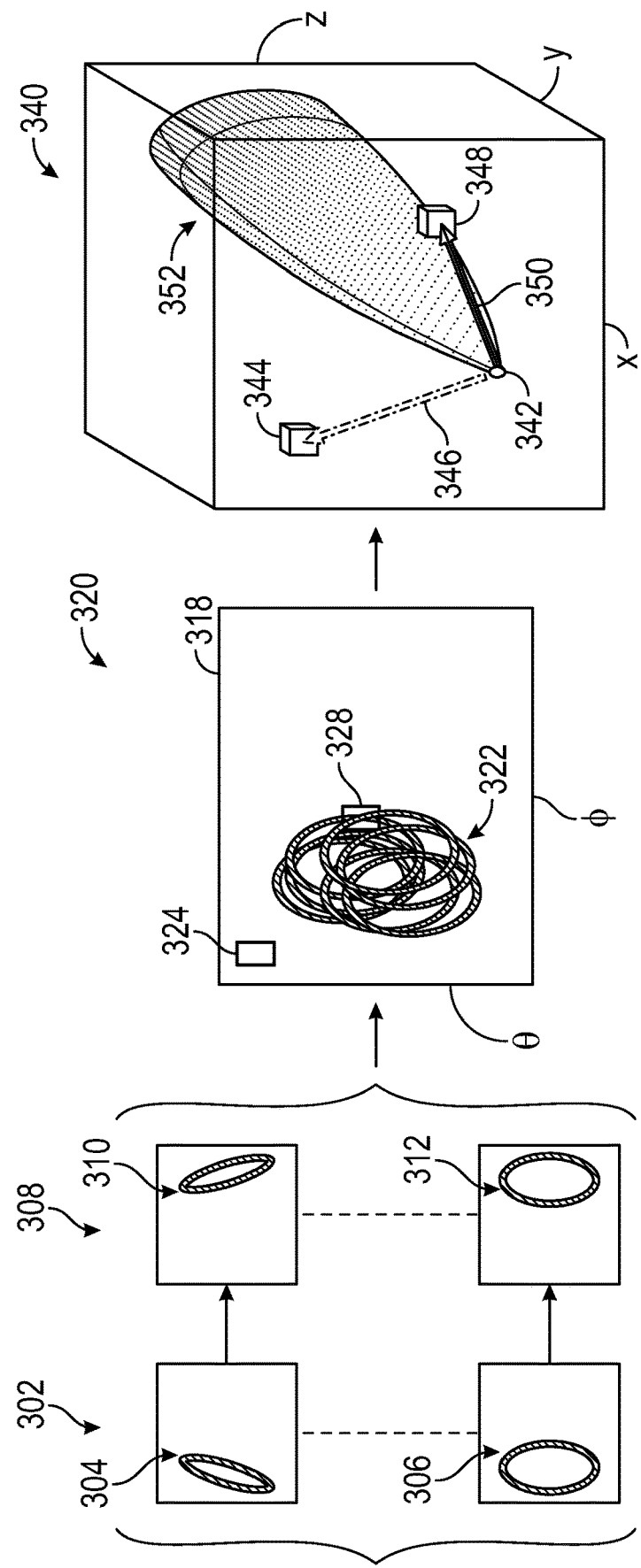
FIG. 4 is a schematic example illustration of portions of the method of FIG. 3, including the reconstruction of radiation events from two-dimensional space to three-dimensional space.

Per block 208 of FIG. 3, the controller C is programmed to designate one of the plurality of buffers as a current buffer (e.g., current buffer 318 in FIG. 4). FIG. 4 shows an example process of summation and reconstruction of a plurality of events 302 from a current buffer 318 (in two-dimensional space 320) to three-dimensional space 340. The plurality of events 302, such as a first individual event 304 and a second (or Nth) individual event 306, are schematically represented as Compton cones in FIG. 4.

Also, per block 208 of FIG. 3, the controller C is programmed to determine if the individual event (received in block 204) falls within the current buffer. As noted above, if the plurality of buffers is temporally defined, the individual event falls within the current buffer 318 when the event time ($t_{event}$) is within the predefined start time and the predefined end time, such that $t_{min,buffer} \leq t_{event} \leq t_{max,buffer}$. If the plurality of buffers is spatially defined, the individual event falls within the current buffer when a respective distance (d) between the event position ($x_{global}$, $y_{global}$, $z_{global}$) and the respective buffer location ($x_{buffer}$, $y_{buffer}$, $z_{buffer}$) is less than or equal to a threshold distance ($\Delta d$). If the individual event (received in block 204) falls within the current buffer, the method 200 proceeds from block 208 to block 210.

Per block 210 of FIG. 3, the controller C is programmed to correct the individual event within the current buffer 318 for pose (position and orientation) and add the individual event to the current buffer 318 in the two-dimensional space 320. When reconstructing events from a detector 14 that is moving, a global reference frame is required. The changes in detector pose, recorded as roll, pitch and yaw, are used to translate the individual events to a common, global reference frame. This common, global reference frame allows for the two-dimensional to three-dimensional reconstruction process described below in block 216.

Referring to FIG. 4, each of the plurality of events 302 is corrected for pose on an event-by-event basis to obtain a corrected set 308 of events. The plurality of events 302 are tagged with a respective event time. Correcting for pose may include obtaining a respective detector pitch, a respective detector yaw and a respective detector roll of the detector 14 at the respective event time and shifting the plurality of events 302 in angular space by the respective detector pitch, the respective detector yaw and the respective detector roll. Referring to FIG. 4, the first individual event 304 and the second (or Nth) individual event 306 are corrected for pose to obtain a corrected first event 310 and a corrected second (or Nth) event 312, respectively. The method 200 proceeds from block 210 to block 212.

From block 210, the method 200 proceeds to block 212. Per block 212 of FIG. 3, the controller C is programmed to align the plurality of events 302 in the common two-dimensional space 320. In some embodiments, the plurality of events 302 are moved into the current buffer 318 and then pose-corrected. In other embodiments, the plurality of events 302 are corrected for pose and then moved into the current buffer 318. Referring to FIG. 4, the current buffer 318 may be represented by a two-dimensional grid (or set of pixels) of angles (θ, φ). The plurality of events 302 may be represented in the current buffer 318 as respective Compton cones 322. Referring to FIG. 4, aligning the plurality of events 302 in the common two-dimensional space includes overlaying the respective Compton cones 322 together in the current buffer 318 in the two-dimensional space 320. As understood by those skilled in the art, for Compton scattering events, Compton cones are developed based on an incident scattering angle and an interaction position. The projection of a Compton cone, in the form of rings, onto an image slice determines the location of a source. Other methods of representation may be employed.

Also, per block 212, the controller C is programmed to record the average spatial coordinates or position (x, y, z) of all the individual events (represented by respective Compton cones 322) in the current buffer 318. From block 212, the method 200 loops back to block 204, as indicated by line 214. Referring to block 208 of FIG. 3, if the individual event (received in block 204) does not fall within the current buffer 318, the method 200 proceeds from block 208 to block 216.

Per block 216 of FIG. 3, the current buffer 318, which contains the contributions from multiple events, is added to the three-dimensional space 340 in one step. In other words, the plurality of events 302 are simultaneously reconstructed in the three-dimensional space 340. The reconstruction into the three-dimensional space 340 is done once for each of the plurality of buffers. The technical advantage here is a much lower computational burden, as opposed to calculating the three-dimensional contributions of individual events on an event-by-event basis.

Also, per block 216 of FIG. 3, the controller C is adapted to determine an average global position 342 for the current buffer 318 by averaging the respective event positions for the plurality of events 302 in the current buffer 318. In other words, the average global position 342 is calculated using the average spatial coordinates or position (x, y, z) of all the individual events in the current buffer 318.

Referring to FIG. 4, the two-dimensional space 320 may be represented by a two-dimensional grid or set of pixels (e.g., represented by angles θ, φ). FIG. 4 shows a first pixel 324, represented by angles (θ1, φ1), and a second pixel 328 represented by angles (θ2, φ2). The contribution of each of the pixels in the current buffer 318 is added to the three-dimensional space 340. The contribution of each of the pixels may be represented by the number of the respective Compton cones 322 in the pixel.

The respective contribution from each pixel in the current buffer 318 is projected from the average global position 342 in the three-dimensional space 340. The three-dimensional space 340 may be represented by three-dimensional voxels. The respective angles (θi, φj) between each three-dimensional voxel in the three-dimensional space 340 and the average global position 342 are computed. The respective angles (θi, φj) are used to look up corresponding pixel values from the two-dimensional buffer image (current buffer 318), which is in angular space and contains the contributions of many events, which are added to each corresponding three-dimensional voxel.

The respective angles (θi, φj) may be represented by vectors extending from the average global position 342. In one example, a first vector 346 extending from the average global position 342 at an angle (θ1, φ1) leads to the first voxel 344. Since the angle (θ1, φ1) corresponds to the first pixel 324, the contribution of the first pixel 324 is added to or reconstructed in the first voxel 344.

In one example, a first vector 346 extending from the average global position 342 at an angle (θ1, φ1) leads to the first voxel 344. Since the angle (θ1, φ1) corresponds to the first pixel 324, the contribution of the first pixel 324 is added to or reconstructed in the first voxel 344. In the example, shown in FIG. 4, the first pixel 324 does not include any of the respective Compton cones 322 [grid2D(θ1, φ1)=0]. In another example, a second vector 350 extending from the average global position 342 at an angle (θ2, φ2) leads to the second voxel 348. Since the angle (θ2, φ2) corresponds to the second pixel 328, the contribution of the second pixel 328 is added to the second voxel 348. The second pixel 328 includes two of the respective Compton cones 322 [grid2D(θ2, φ2)=2]. This process is repeated for each of the angles (θi, φj). This process is also repeated each time the current buffer 318 is filled, gradually filling in and creating a three-dimensional image or three-dimensional distribution 352. The method 200 proceeds from block 216 to block 218.

Per block 218 of FIG. 3, the controller C is programmed to hold the individual event, which falls outside of the current buffer 318, in memory and to reset a number of parameters. The controller C is programmed to zero the current buffer 318, removing the contribution of older, 'stale' events, and subsequently designating another of the plurality of buffers as the current buffer 318. In other words, the controller C chooses new temporal or spatial boundaries for the current buffer 318. The rate at which new buffers are needed is a function of the inputs (i.e., the buffer updating frequency) designed in block 202. Block 218 includes resetting the list of global three-dimensional event positions (used to compute an average global position 342) in order that a new buffer-averaged global position 342 may be obtained.

Per block 220 of FIG. 3, the controller C is programmed to determine if a signal to finish the method 200 or process has been received. The signal may be in the form of a predefined measurement time limit that has ended or a signal from a user, for example, through an input device (e.g., a mouse or touchscreen button). If the signal is not received, the method 200 loops from block 220 to block 210. Per block 210, the individual event is added to the current buffer 318. Since the parameters have been reset in block 218, the "current buffer 318" is now a different buffer, with different temporal or spatial boundaries.

If the signal for completion has been received, the method 200 proceeds from block 220 to block 222, where the controller C is programmed to output the three-dimensional distribution 352 and the method 200 is ended.

Figure 2:
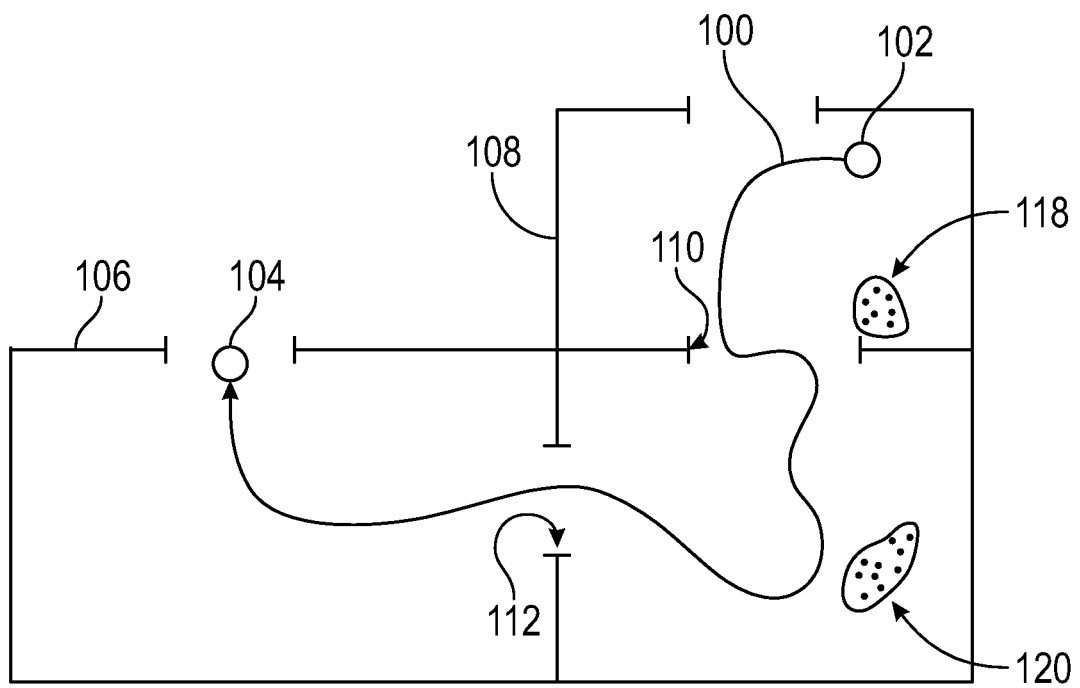
FIG. 2 is a diagram of an example of source localization carried out by the imaging system of FIG. 1.

Referring now to FIG. 2, a diagram of an example source localization carried out by the imaging system 10 (see FIG. 1) is shown. The imaging device 12 is taken on a route 100, from a starting point 102 to an ending point 104. The imaging device 12 may be carried by a user or transported on a mobile platform or robot (not shown), which may be remotely controlled or autonomous. The controller C (of FIG. 1) is adapted to construct a three-dimensional distribution of one or more sources of interest along the route 100. In the example shown, the route 100 is inside a building 106 having multiple walls 108. Referring to FIG. 2, as the imaging device 12 is transported through a first door 110 and a second door 112 of the building 106, the imaging device 12 collects radiation data. The imaging device 12 may stream the radiation data in real-time to the controller C and/or record the radiation data. The radiation data accumulated over the route 100 is employed to construct a map in three-dimensional space 340, via execution of method 200 of FIG. 3. In the example shown in FIG. 2, the three-dimensional image or distribution indicates a first source 118 and a second source 120 observed along the route 100.

In summary, the imaging system 10 employs a two-dimensional to three-dimensional approach to minimize the computational burden of creating a three-dimensional image or distribution. The use of a current buffer 318 (which contains the contributions of many events) in a common, two-dimensional space 320 reduces the frequency at which the three-dimensional reconstruction is to be conducted. The process of reconstructing events in three-dimensions is done once per buffer, instead of on an event-by-event-basis. Conducting the three-dimensional reconstruction of many events at once makes full three-dimensional reconstructions computationally tractable on embedded systems without the requisite memory and processing capacities.

The controller C includes a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, other physical media with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above and may be accessed via a network in any one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts presented herein illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based devices that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An imaging system comprising:
   a detector configured to obtain radiation data from one or more sources, the radiation data including a plurality of events;
   a controller configured to receive the radiation data, the controller having a processor and tangible, non-transitory memory on which instructions are recorded;
   wherein execution of the instructions by the processor causes the controller to:
      define a plurality of buffers based on at least one initial condition and designate one of the plurality of buffers as a current buffer;
      receive an individual event of the plurality of events and determine if the individual event falls within the current buffer;

correct each of the plurality of events within the current buffer for pose, including time-tagging the plurality of events with a respective event time, obtaining a respective detector pitch, a respective detector yaw and a respective detector roll of the detector at the respective event time and shifting the plurality of events in angular space by the respective detector pitch, the respective detector yaw and the respective detector roll;

align the plurality of events in the current buffer in a two-dimensional space;

reconstruct the plurality of events in the current buffer in a three-dimensional space, the reconstruction being done once for each of the plurality of buffers; and create a three-dimensional image based in part on the reconstruction in the three-dimensional space.

2. The imaging system of claim 1, wherein after reconstructing the plurality of events in the current buffer in the three-dimensional space, the controller is configured to:

designate another of the plurality of buffers as the current buffer.

3. The imaging system of claim 1, wherein:

the at least one initial condition is time-based such that the current buffer is within a predefined start time and a predefined end time, the individual event defining an event time; and the individual event falls within the current buffer when the event time is within the predefined start time and the predefined end time.

4. The imaging system of claim 1, wherein:

the at least one initial condition is distance-based such that the current buffer defines a respective buffer location, the individual event defining an event position; and the individual event falls within the current buffer when a respective distance between the event position and the respective buffer location is less than or equal to a threshold distance.

5. The imaging system of claim 1, wherein:

the at least one initial condition includes an updating frequency of the plurality of buffers.

6. The imaging system of claim 5, wherein:

the updating frequency is between about 0.5 and 3 seconds.

7. The imaging system of claim 1, wherein:

the detector is configured to be position sensitive.

8. The imaging system of claim 1, wherein aligning the plurality of events in the two-dimensional space includes:

representing the plurality of events in the current buffer as respective Compton cones; and overlaying the respective Compton cones together in the two-dimensional space.

9. The imaging system of claim 1, wherein reconstructing the plurality of events into the three-dimensional space includes:

determining an average global position for the current buffer, the average global position being an average of a respective event position for the plurality of events in the current buffer.

10. The imaging system of claim 9, wherein reconstructing the plurality of events into the three-dimensional space includes:

representing the three-dimensional space by three-dimensional voxels;

obtaining respective angles between each of the three-dimensional voxels and the average global position in the three-dimensional space;

obtaining corresponding pixel values from the current buffer based on the respective angles, the corresponding pixel values being represented by respective Compton cones; and adding a respective contribution of the corresponding pixel values to the three-dimensional voxels.

11. A method of operating an imaging system having a detector configured to obtain radiation data and a controller with a processor and tangible, non-transitory memory on which instructions are recorded, the method comprising:

defining a plurality of buffers based on at least one initial condition and designating one of the plurality of buffers as a current buffer, via the controller;

receiving the radiation data, via the controller, the radiation data including a plurality of events;

determining if an individual event of the plurality of events falls within the current buffer, via the controller;

correcting the plurality of events within the current buffer for pose, including tagging the plurality of events with a respective event time, obtaining a respective detector pitch, a respective detector yaw and a respective detector roll of the detector at the respective event time and shifting the plurality of events in angular space by the respective detector pitch, the respective detector yaw and the respective detector roll;

aligning the plurality of events in the current buffer in a two-dimensional space, via the controller;

reconstructing the plurality of events in the current buffer in a three-dimensional space, via the controller, the reconstruction being done once for each of the plurality of buffers; and creating a three-dimensional image based in part on the reconstruction in the three-dimensional space, via the controller.

12. The method of claim 11, further comprising, after reconstructing the plurality of events in the current buffer in the three-dimensional space:

designating another of the plurality of buffers as the current buffer.

13. The method of claim 11, further comprising:

selecting the at least one initial condition to be time-based such that the current buffer is within a predefined start time and a predefined end time, the individual event defining an event time; and determining the individual event to be within the current buffer when the event time is within the predefined start time and the predefined end time.

14. The method of claim 11, further comprising:

selecting the at least one initial condition to be distance-based such that the current buffer defines a respective buffer location, the individual event defining an event position; and determining the individual event to be within the current buffer when a respective distance between the event position and the respective buffer location is less than or equal to a threshold distance.

15. The method of claim 11, wherein aligning the plurality of events in the two-dimensional space includes:

representing the plurality of events in the current buffer as respective Compton cones; and overlaying the respective Compton cones together in the two-dimensional space.

16. The method of claim 11, wherein reconstructing the plurality of events into the three-dimensional space includes:

representing the three-dimensional space by three-dimensional voxels;

obtaining respective angles between each of the three-dimensional voxels and an average global position in the three-dimensional space, the average global position being an average of respective event positions for the plurality of events in the current buffer;

obtaining corresponding pixel values from the current buffer based on the respective angles, the corresponding pixel values being represented by respective Compton cones; and adding a respective contribution of the corresponding pixel values to the three-dimensional voxels.

17. An imaging system comprising:

a detector configured to obtain radiation data from one or more sources, the radiation data including a plurality of events;

a controller configured to receive the radiation data, the controller having a processor and tangible, non-transitory memory on which instructions are recorded;

wherein execution of the instructions by the processor causes the controller to:

define a plurality of buffers based on at least one initial condition and designate one of the plurality of buffers as a current buffer;

receive an individual event of the plurality of events and determine if the individual event falls within the current buffer;

align the plurality of events in the current buffer in a two-dimensional space;

reconstruct the plurality of events in the current buffer in a three-dimensional space, the reconstruction being done once for each of the plurality of buffers; and create a three-dimensional image based in part on the reconstruction in the three-dimensional space; and wherein reconstructing the plurality of events into the three-dimensional space includes:

representing the three-dimensional space by three-dimensional voxels;

obtaining respective angles between each of the three-dimensional voxels and an average global position in the three-dimensional space, the average global position being an average of a respective event position for the plurality of events in the current buffer;

obtaining corresponding pixel values from the current buffer based on the respective angles, the corresponding pixel values being represented by respective Compton cones; and adding a respective contribution of the corresponding pixel values to the three-dimensional voxels.

* * * * *